Patented Feb. 5, 1946

2,394,407

UNITED STATES PATENT OFFICE 2,394,407

POLYMERIZATION OF HEAT POLYMERIZABLE AROMATIC OLEFINS

Frank J. Soday, Swarthmore, Pa., assignor to The United Gas Improvement Company, a corporation of Pennsylvania No Drawing. Application December 13, 1939, Serial No. 308,955

11 Claims. (Cl. 204—162)

This invention pertains to the polymerization of aromatic olefins.

In general, this invention pertains to the polymerization of aromatic olefins, or mixtures thereof, by the application of infra red radiations.

More particularly, this invention pertains to the polymerization of aromatic olefins, or to mixtures containing aromatic olefins, by infra red radiations in the near visible range, that is, in the range of 10,000–20,000 A. Infra red rays in which the major portion lies between 10,000 A. and 16,000 A. are particularly preferred.

This invention is particularly applicable to those types of aromatic olefins which may be polymerized by the application of heat. Although practically all aromatic olefins may be polymerized by prolonged application of heat, certain aromatic olefins are sufficiently active to be polymerized by the use of reasonably short heating periods. It is to this latter class of aromatic olefins that this invention is particularly directed.

Representative of this class of hydrocarbons are styrene, styrene homologues, such as ortho-methyl styrene, meta-methyl styrene, para-methyl styrene, alpha-methyl styrene, beta-methyl styrene, the ethyl-substituted styrenes, the propyl-substituted styrenes, and the like, and divinyl benzene.

The polymerization of monomeric styrene by the application of heat results in the production of a light colored, tough, thermoplastic resin, which has found numerous applications in the industry. It is particularly well adapted to the production of molded articles by means of the injection molding process.

The two chief defects of polystyrene are its relatively low initial softening point and its tendency to craze. By crazing is meant the development of fine lines on the surface of the resin, which ultimately partially or completely destroy its surface lustre and transparency. This has tended to restrict the use of polystyrene, particularly for those applications in which the appearance of the finished article is a factor.

The relatively low initial softening point of polystyrene also limits its application in certain fields, particularly in the electrical, radio, and television fields. Polystyrene is otherwise eminently suited for these applications due to its excellent electrical insulating properties, in which it far surpasses any other known resin or plastic material. As a relatively large portion of the applications for which polystyrene might be used in these fields involve exposure to relatively high temperature conditions, the usefulness of polystyrene in the electrical industry has been considerably restricted by its low initial softening point.

I have found that the crazing of polystyrene can be retarded or completely eliminated, and its initial softening point considerably increased, by the polymerization of monomeric styrene with infra red rays, particularly those in which the wave length of the major portion of the rays lie between 10,000 A. and 20,000 A. Infra red radiations having average wave lengths in the range of 10,000 A. to 16,000 A. are particularly preferred.

Although any suitable source of infra red rays in this range may be used for the polymerization of aromatic olefins in general, and styrene and styrene homologues in particular, I have found that certain incandescent electrical light bulbs, such as the carbon filament lamp, are excellent sources of rays of this particular type. A carbon filament lamp of 50 candle power and of from 240 to 260 watts, is a particularly desirable source of energy for this purpose, the major portion of the rays emitted being in the near infra red range, namely, 10,000 A. to 16,000 A.

In using incandescent light bulbs for the production of infra red rays for the polymerization of aromatic olefins, it is desirable to operate these units at a low filament temperature in order to avoid producing unnecessary quantities of visible radiation, namely, in the range of 4,000 to 7,800 A., as well as to prolong the life of the unit.

The results obtained by the use of infra red rays in the range of 10,000 A. to 16,000 A. for the polymerization of aromatic olefins may be tentatively explained in the following way, it being understood that the invention is not to be limited in any way by such explanation. It has been stated by a number of other investigators that the crazing of polystyrene is caused by the presence of monomeric styrene, or relatively low molecular weight polymers, in the finished resin. In the same way, the relatively low initial softening point of polystyrene may be regarded as being due to the inclusion of monomeric styrene, or of polymers of relatively low molecular weight, in the finished resin.

Polystyrene is normally prepared by the application of heat to monomeric styrene. Catalysts are sometimes employed, in conjunction with the application of heat, to polymerize styrene, but the polymer so obtained almost invariably has a lower melting point than that produced by the use of thermal methods alone. During the early stages of the polymerization, the solution is quite mobile, permitting a ready transfer of energy from one part of the system to the other. However, the solution becomes more viscous as the polymerization continues, setting to a gel like solid when the conversion is approximately 50% complete. From this point on, the union of monomeric styrene molecules with each other, or with the styrene polymers present to form units of higher molecular weight, is considerably retarded by the highly viscous nature of the system. This is particularly pronounced whenever the conversion of monomeric styrene to polystyrene approaches completion.

Due to the extremely viscous nature of the plastic mass at this stage of the polymerization, as well as to the excellent thermal insulating properties of polystyrene, it is extremely difficult to increase the activity of the molecules by the application of energy, such as in the form of heat. Consequently, the reaction velocity decreases at a very rapid rate in the latter stages of the polymerization, resulting in the production of polystyrene containing traces of monomeric styrene and/or low molecular weight styrene polymers.

When heat rays are impinged upon styrene during the course of the polymerization, a portion are transmitted through the system, a portion are absorbed, and a portion reflected. The heat rays reflected from the surface of the polymerizing system, of course, do not influence the nature or extent of the reaction in any way. The heat rays transmitted and absorbed, however, profoundly effect the reaction, the exact nature of such effect depending, among other things, upon the wave length of the radiation and the ratio of transmitted and absorbed rays at different levels of the polymerizing system.

It has been found that infra red rays, the major portion of which lie in the near visible range, namely, 10,000 to 16,000 A., are much more effective for the preparation of a polymer of good quality from monomeric styrene than infra red rays which are longer in wave length, say 20,000 to 100,000 A. Infra red rays of the former wave length may be readily obtained from carbon filament bulbs of the type previously described, while rays of the latter wave length may be obtained from an open wire resistance heater.

While exact information as to the ratio between transmitted and absorbed rays at any given depth in the polymerizing system previously referred to is not available, comparative data available in the case of water is of interest as the relative order perhaps should prevail in the case of the styrene system. These data are shown in the following table.

*Ratio of transmitted and absorbed infra red rays in water*

| Depth in mm. | Iron wire heater | | Carbon filament lamp | |
|---|---|---|---|---|
| | Transmitted, percent | Absorbed, percent | Transmitted, percent | Absorbed, percent |
| Surface | | 96.9 | | 65.0 |
| 1 | 3.1 | 2.0 | 35.0 | 14.0 |
| 2 | 1.0 | 0.35 | 28.0 | 7.0 |
| 3 | 0.65 | 0.10 | 24.0 | 4.0 |
| 4 | 0.55 | 0.05 | 22.0 | 2.0 |
| 5 | 0.5 | | 20.0 | |

These data indicate that practically all of the energy given off by the iron wire heater is absorbed at the surface, while a large portion of the corresponding energy released by the carbon filament lamp is transmitted into the interior of the system.

It is believed that this phenomena accounts for the excellent results obtained by the use of the carbon filament lamp in the polymerization of aromatic olefins, particularly styrene or styrene homologues. The use of the conventional type of wire resistance heater results in the production of infra red rays of predominately long wave length, the majority of which are absorbed at the surface of the polymerizing system. The transmission of energy into the interior of the system then can be accomplished only by conduction, which is a relatively inefficient method due to the extremely poor thermal conductivity of polystyrene. As a result, insufficient energy is transmitted into the interior of the mass to convert the last traces of monomeric styrene, or low molecular weight styrene polymers, to polystyrene having a high average molecular weight. Consequently, the product obtained by the application of infra red rays of the type emitted by the usual resistance wire heater, or by other open metallic heating surfaces, namely, those rays in the range of 20,000 to 100,000 A., possesses a relatively low initial softening point and usually crazes within a short period of time.

In the polymerization of monomeric styrene by the application of infra red rays of which the major portion is substantially below 20,000 A., on the other hand, energy is transmitted to, and absorbed in, the interior of the polymerizing system throughout the entire polymerizing process. While this may not influence the course of the reaction to any marked extent during the early stages of the polymerization, due to the exothermic nature of the reaction at this point, it has a decided effect upon the nature of the product obtained during the final stages of the polymerization. As previously pointed out, the reaction of monomeric styrene with itself, or with certain of the polymers already formed, becomes progressively more difficult as the reaction approaches completion due to the increasing viscosity of the reaction medium. The transfer of energy to the interior of the reaction mass during this stage of the polymerization by means of infra red rays of predominately short wave length, activates the monomeric styrene molecules present and assists in the conversion of all of the low molecular weight material present to polystyrene having a high molecular weight. As a result, the polystyrene obtained has a relatively high initial softening point and is relatively free from crazing.

Infra red rays having the desired wave length may be obtained in any desired way, such as, for example, the use of a carbon filament incandescent lamp. The desired unit may be used alone, or in conjunction with other sources of heat. For example, a carbon filament bulb, or bulbs, may be mounted in a furnace provided with other means of generating heat such as metallic resistance wires. The energy then supplied to the material being polymerized is furnished in part by the usual type of heated surface, and in part by the carbon filament bulb. This method can be used for the preparation of polymers having certain specific properties, such as an initial soften point in the range between that produced by the use of ordinary heating methods, on the one hand, and the carbon filament lamp, on the other hand. However, for most purposes I prefer to use infra red rays the major portion of which is below 20,000 A. in wave length, as the only source of energy for the polymerization of aromatic olefins.

The time required for the polymerization of aromatic olefins by the application of such infra red rays is substantially less than that required when infra red rays are employed the major portion of which is of higher wave length. The polymerizing time also may be further reduced by the use of certain catalysts in conjunction with infra red rays of the desired wave length. The catalysts which may be used for this purpose comprise metallic halides, such as aluminum chloride, boron trifluoride, and the like, metallic halide-organic solvent complexes, such as ferric chloride-diethyl ether complex, mineral acids, such as sulfuric acid, mineral acid—organic solvent mixtures, such as sulfuric acid—diethyl ether mixtures, alkyl or aryl sulfates, contact materials, such as clay, activated clay, alumina, activated alumina, silica, activated silica, and the like, and organic peroxides, such as benzoyl peroxide, isoprene peroxide, and pinene peroxide. I prefer to use the organic peroxides when employing catalysts in conjunction with infra red rays.

In general, however, the use of catalysts tends to lower the initial softening point of the polymers obtained.

An alternative method is the use of infra red rays the major portion of which lies in the band of wave lengths from 10,000 A. to 20,000 A. for only a portion of the total polymerizing time. For example, an aromatic olefin may be polymerized for a period of time by the application of heat from ordinary sources, or by the use of suitable catalysts, or both, followed by the use of infra red rays the major portion of which lies in the band of wave lengths from 10,000–20,000 A. to complete the polymerization. Conversely, infra red rays having the desired wave length may be used to initiate the reaction, followed by the use of other polymerizing methods to complete the reaction. However, the results obtained by the application of these special methods are, in general, less satisfactory than the application of infra red rays the major portion of which lies in the band of wave lengths from 10,000 A.–20,000 A. as the sole source of energy, except perhaps in the preparation of special products.

The time necessary to complete the polymerization of aromatic olefins may be considerably reduced by increasing the polymerizing temperature employed. This may be done by increasing the number or size of the infra red bulbs, or other source of infra red rays employed, or by the application of conventional heating methods. The former method is preferred.

The use of excessive polymerizing temperatures will usually be avoided, however, when a high melting point product is desired, as the initial melting point of the polymer subsequently obtained decreases with increasing polymerizing temperatures. Polymerizing temperatures below 200° C. have been found to be suitable for the polymerization of most aromatic olefins.

Excellent results are obtained by the polymerization of aromatic olefins, especially styrene and methyl styrene, by the use of polymerizing temperatures in the range of 80 to 160° C. Particularly desirable polymers are obtained by the use of polymerizing temperatures in the range of 90 to 125° C.

The use of higher temperatures near the end of the polymerizing process are sometimes desirable, however, in order to assist in completely converting the monomeric styrene, or styrene polymers of low molecular weight, to polystyrene having a high average molecular weight. For example, excellent samples of polystyrene have been prepared by the polymerization of monomeric styrene at 110° C. in the presence of infra red rays the major portion of which lies in the band of wave lengths from 10,000–16,000 A. until the major portion of the monomer has been converted to polymer, followed by heating the system for a relatively short period of time at a temperature of 145° C.

The use of infra red rays the major portion of which lies in the band wave lengths from 10,000–20,000 A. is applicable to the polymerization of aromatic olefins of any desired concentration or state of purity. For example, pure monomeric styrene, monomeric styrene solutions in various solvents, and light oil styrene fractions, can be converted to polystyrene in a satisfactory manner by this process. In general, the initial melting point of the resulting polymer is a function of the concentration and degree of purity of the starting material. However, for solutions of monomeric styrene in an inert solvent, a sharp break in the curve of melting point vs. viscosity is not reached until the concentration of monomeric styrene present in the initial solution approaches 30% by weight, or less, of the total weight of the solution.

Aromatic olefins, or mixtures thereof, also may be polymerized in the form of aqueous emulsions by the application of infra red rays the major portion of which lies in the band of wave lengths from 10,000 to 20,000 A. The emulsions so obtained may be used as such, or they may be coagulated by known methods.

In addition to the polymerization of aromatic olefins, or mixtures of aromatic olefins, the process is also applicable to the polymerization of mixtures of aromatic olefins with other unsaturated organic compounds capable of being polymerized by the application of heat. Illustrative of these compounds are acrylic acid, esters of acrylic acid, methacrylic acid, esters of methacrylic acid, vinyl derivatives, such as vinyl acetate and vinyl chloride, vinylidene derivatives, such as vinylidene chloride, unsaturated aldehydes and ketones, and the like.

Infra red rays of the desired wave length may be used for the polymerization of aromatic olefins or mixtures thereof, or mixtures of aromatic olefins with other unsaturated organic compounds, in any desired manner. One method of applying these rays, comprises the following. A carbon filament bulb of the type previously described is mounted in an insulated container, and suitable means are provided for controlling the temperature within the container to the desired level. This is usually accomplished by controlling the current supplied to the lamp by means of a suitable thermoelement situated within the insulated container. The aromatic olefin is placed in a suitable vessel and exposed to the infra red rays generated by the carbon filament bulb until the material has been polymerized to the desired extent. For industrial application, of course, this unit can be increased to any desired size. Any of the usual industrial heating or baking ovens or tunnels may be provided with a plurality of bulbs of the type desired and used for the polymerization of aromatic olefins by means of infra red rays of the desired wave length.

The infra red rays emitted by the carbon filament bulb, or other type of bulb capable of generating rays of the desired wave length, may be focused upon or into the vessel or container in which the desired unsaturated hydrocarbon has been placed by the use of suitable shields or reflectors. Reflectors fabricated from non-tarnishable metals capable of taking a high polish are especially suited for this purpose, examples of which are silver, gold, copper, chromium, aluminum and nickel. The comparative reflecting efficiencies of these metals are as follows.

| Metal | Wave length in Angstrom units | Efficiency in percent |
|---|---|---|
| Silver | 6,000–16,000 | 92–98 |
| Gold | 6,000–16,000 | 84–95 |
| Copper | 6,000–16,000 | 72–95 |
| Aluminum | 6,000–16,000 | 72–80 |
| Nickel | 6,000–16,000 | 65–80 |

Copper and silver corrode rapidly, resulting in a marked reduction in their reflecting capacity.

Alternatively, the reflector may be lined or plated with the desired metal. Metallic reflectors which have been plated with gold, or provided with a polished gold liner, have been found to be eminently suited for this purpose.

Infra red rays of the preferred wave length may be used for the polymerization of aromatic olefins in open containers.

The heat generated within the interior of the material being polymerized by the penetrating rays is sufficient to raise the average temperature of the mass to the level necessary to cause it to polymerize to the desired extent. The use of carbon filament bulbs provided with efficient reflectors have been found to be eminently satisfactory for this purpose.

Various types and sizes of containers may be used to hold the aromatic olefin during the polymerizing process. Vessels constructed from various metals, such as iron, lead, tin and aluminum, as well as from various alloys, may be used for this purpose. The use of metals having a low melting point is of advantage in certain cases, as the metal vessel may be stripped from the finished polymer, remelted, and used for the preparation of succeeding molds.

As infra red rays cannot penetrate through thick metallic layers, thin sheets of the selected metal or alloy should be used for the construction of metallic vessels to be used for the polymerization of aromatic olefins by transmission through the metal of infra red rays of the preferred wave length. An alternative method is the use of open metallic vessels for this purpose, the infra red rays being projected into the interior of the materials to be polymerized through the open top of the vessel. A combination of either or both of these and/or other procedures may also be employed, if desired.

Glass vessels may be used for the polymerization of aromatic olefins by infra red rays. As ordinary glass, or heat-resistant glass, is a fairly good transmitting agent for infra red rays, the material to be polymerized may be sealed in glass containers and exposed to infra red radiations for polymerization, if desired. Various commercial glass shapes may be used for this purpose, electric light bulb blanks being especially desirable. Open glass vessels also may be employed.

Metallic vessels may be provided with glass windows in order to permit the infra red rays to more readily pass into the interior of the material to be polymerized, if desired.

In addition to glass and metals, other materials may be used for the construction of vessels for containing aromatic olefins during the polymerizing process. These include ceramic ware, paper, cardboard and plastic containers.

The polymerization may be conducted in the presence of air, or in the presence of any desired inert atmosphere, such as nitrogen or carbon dioxide. In general, the polymerization of aromatic olefins in the presence of air results in the production of polymers which are slightly colored, particularly on the surface which has been in contact with the atmosphere during the polymerizing process. As this is undesirable for certain applications, the polymerization of the aromatic olefin is usually carried out in an inert environment in such cases.

This may be accomplished by sealing the desired aromatic olefin in a suitable container, such as a glass vessel, to the exclusion of any atmosphere, or in the presence of the desired inert atmosphere, followed by exposing the vessel to the action of infra red rays of the preferred wave length until the reaction has proceeded to the desired extent. An alternative method consists of placing the aromatic olefin in an open vessel, after which it is placed in a container in which the atmosphere may be controlled at will, and which is provided with a source of infra red rays of the preferred wave length. Other procedures will suggest themselves to persons skilled in the art upon becoming familiar herewith.

In addition to the use of this process for the preparation of solid polymers from aromatic olefins, or mixtures thereof, or mixtures of aromatic olefins with other unsaturated organic compounds, it may also be used in conjunction with the preparation of liquid polymers from these materials by suitable means, such as by the use of unusually high temperatures, active catalysts, and/or the like.

The process also may be used for the production of partially polymerized solutions. Partly polymerized solutions are commonly referred to as casting syrups and, as their name implies, they may be used for subsequent casting operations. In addition, they may be used for a number of other purposes, for example, as cements, as impregnating solutions for textiles and paper, and the like.

The process also is well adapted to the production of hydrocarbon polymers containing inserts of a desired type. The aromatic olefin is placed in a suitable container in which the insert, or inserts have been placed in the desired manner, after which the aromatic olefin is polymerized by the application of infra red rays of the preferred wave length. Alternatively, the aromatic olefin may be polymerized until it has attained the proper consistency, after which the insert or inserts may be placed in the desired position, and the polymerization then completed.

The process is further illustrated by the following examples.

*Example 1*

A 50 cc. sample of monomeric styrene was placed in a glass test tube, after which the air in the test tube was displaced with nitrogen, and the tube sealed. The sealed tube was then placed in an oven heated by an open Nichrome resistance wire, the temperature of which was maintained at 110° C. by a suitable control device. The tube was permitted to remain in this oven for a period of 8 days. The polystyrene sample obtained crazed completely within a period of one month, becoming entirely opaque.

Example 2

A 50 cc. portion of the same sample of monomeric styrene was sealed in a glass test tube in which the air had been displaced by nitrogen, after which it was sealed and placed in an oven provided with a 240 watt carbon filament bulb. The major portion of the infra red rays emitted by this bulb lay in the band of wave lengths from 10,000–16,000 A. The temperature of the oven was maintained at 110° C. by a suitable device controlling the current flow to the bulb. The sample was permitted to remain in the oven for a period of 8 days. The polystyrene sample obtained was perfectly clear and transparent, and was completely free from crazing, when examined after a period of five months.

Example 3

A 120 cc. sample of monomeric styrene was placed in an open aluminum container and polymerized in an oven provided with an open Nichrome resistance wire for 8 days at a temperature of 110° C. The sample was then annealed by heating for a period of 2 hours at a temperature of 140° C., followed by heating for 2 hours at 100° C. (Sample A.)

A 120 cc. portion of the same sample of monomeric styrene was polymerized in the same manner, with the exception that a 240 watt carbon filament bulb, the major portion of the radiations from which lay in the band of wave lengths from 10,000–16,000 A., was used as the source of heat. (Sample B.)

The central portion of each of the polystyrene samples obtained was then reduced to a diameter of 0.375 inch. Two marks exactly one half inch apart were then inscribed around the circumference of each test piece, the marks being located on that portion which had been reduced previously in diameter. A nine pound weight was attached to one end of each of the test pieces, the other end then being attached to a suitable support in an oven. The oven was then maintained at a temperature of 80° C. for a period of 24 hours, after which each of the samples was removed and measured. They were then returned to the oven, which was maintained at a temperature of 90° C. for 24 hours. After being removed and measured, they were further heated at a temperature of 100° C. for a period of 24 hours. The following results were secured.

| Heating schedule | Percentage elongation | |
| --- | --- | --- |
|  | Sample A (Resistance oven) | Sample B (Carbon filament bulb) |
| 24 hours @ 80° C | 3.4 | 0.4 |
| 24 hours @ 90° C | 15.7 | 2.2 |
| 24 hours @ 100° C | 23.2 | 22.9 |
| Total elongation | 42.8 | 25.5 |

It will be noted that the polystyrene sample which had been prepared by the polymerization of monomeric styrene with infra red rays the major portion of which lay in the band of wave lengths from 10,000–16,000 A. showed considerably less elongation under stress at the designated heating periods than the corresponding sample which had been prepared by the polymerization of monomeric styrene by the use of infra red rays of longer wave lengths, namely, in the range of 20,000–100,000 A.

According to the standards set up in the radio industry, sample A has an initial softening point of 90° C., while sample B has an initial softening point of 100° C. In other words, the initial softening point is taken as the temperature prevailing during that heating period in which substantially abrupt change in the magnitude of elongation is observed. An increase in the initial softening point of polystyrene of 10° enormously increases the field of usefulness of this material in the electrical field, particularly in the radio and television divisions.

Example 4

A 50 cc. portion of monomeric styrene was placed in an aluminum container 2″ in diameter and 5″ tall. An aluminum insert ¼″ in diameter was placed in the container, after which the styrene was polymerized by heating for 4 hours at 110° C., then for 72 hours at 120° C., and finally for 12 hours at 140° C. The source of heat in each case was a carbon filament bulb. The major portion of the infra red rays from this bulb lay in the band of wave lengths from 10,000 to 16,000 A.

A clear, transparent styrene casting containing the desired insert was obtained.

Example 5

A 50 cc. sample of para methyl styrene was placed in a glass test tube, after which the air in the tube was displaced with nitrogen, and the tube sealed. The tube was then placed in an oven provided with a 240 watt carbon filament bulb, the major portion of the rays from which lay in the band of wave lengths from 10,000–16,000 A. The polymerization was continued for a period of 8 days at 100° C., the temperature being maintained at the desired point by the use of a suitable device controlling the flow of current to the bulb.

A water-white sample of polymethylstyrene resin was secured. This sample possessed excellent physical and electrical properties.

The above examples clearly illustrate the advantages of my process.

My invention may be advantageously employed regardless of the thickness of the mass undergoing polymerization. This is because even though the mass undergoing polymerization is thicker than the depth of penetration of infra red rays of the preferred wave length, the path through which heat must be carried by conduction is very materially reduced.

It is understood, of course, that any desired part or parts or all of the surface of the mass undergoing polymerization may be exposed to infra red rays of preferred wave lengths set forth either through a retaining wall or walls or directly, or any combination of the foregoing, or otherwise.

The mass undergoing polymerization may take any form or shape, such as blocks, rods, tubes, sheets, special forms, the form of the finished object, etc.

For illustration, the aromatic olefine or olefines may be polymerized in the form of thin films, in which case the polymerization may take place on the surface of a desired material such as metal, paper, a textile, glass, fibers, etc., to which it is intended to adhere or as in the case of a smooth surface, from which it might be stripped, if desired. As an example, resinous products may be produced in thin films by supplying the reacting material in distributed form to a moving surface on which it is exposed to infra red rays in the near visible range and after polymerization of the film with or without the assistance of another source of heat, or a catalyst, or otherwise, or any combination of the foregoing, it may be stripped from such surface. By making the moving surface endless, the feeding of the material to be polymerized and the stripping of the polymerized film may be made continuous. As a further illustration of how the material may be distributed over different types of moving surfaces in film form and of how polymerized sheets may be stripped from such surfaces, reference may be had to my copending application Serial No. 280,724, filed June 23, 1939, which has matured into Patent 2,345,013 granted March 28, 1944.

Another special method of procedure comprises introducing the aromatic olefin material into the upper portion of a tower in finely divided form and permitting the finely divided particles to descend through the tower while being exposed to infra red rays in the near visible range. For towers to which my invention may be adapted, reference may be had to my copending application Serial No. 283,165, filed July 7, 1939, which has matured into Patent 2,375,256 granted May 8, 1945.

It is, of course, understood that various types of materials, such as textiles, paper, fibrous substances, etc., might be impregnated with unpolymerized or partially polymerized material and then subjected to the treatment of my process for the purposes of polymerization.

In this connection, it will also be understood that the further polymerization, for example, to completion, of partially polymerized material, such as casting syrups and cements may be carried out generally by the use of my process, or said partially polymerized material may be prepared by my process, or may be both prepared and later further polymerized.

Likewise, aromatic olefin material may be polymerized in molds in the usual way followed by a treatment with infra red rays in the near visible range to remove all traces of unpolymerized material. This applies particularly to styrene as well as to other unsaturated compounds whose polymers have a tendency to craze, such as methyl methacrylate.

While the invention has been described more particularly with respect to the polymerization of aromatic olefins individually, it may, as above indicated be extended to the copolymerization of aromatic olefins with each other and to the polymerization of aromatic olefins with heat polymerizable unsaturated materials generally. Thus it is broadly applicable to both homo-polymerization and co-polymerization processes.

Polymerization may, of course, take place in the presence or absence of plasticizing agents, pigments, dyes, fillers, softening agents, extenders, plastic materials, rubber, and/or other additives. Other variations will occur to persons skilled in the art upon becoming familiar herewith.

Therefore, changes, omissions, additions, substitutions, and/or modifications might be made within the scope of the claims without departing from the spirit of the invention.

I claim:

1. A process for the polymerization of aromatic olefin material which is capable of being polymerized by the aid of heat, which comprises polymerizing said material under polymerizing temperature conditions below 200° C. by radiant heat the major portion of which is in the form of infra red radiation of wave length from 10,000 Angstrom units to 20,000 Angstrom units.

2. A process for the polymerization of unsaturated hydrocarbon material having the styrene nucleus and capable of being polymerized by heat which comprises causing polymerization by heating said unsaturated hydrocarbon material under temperature conditions between 80 and 160° C. by irradiating said material with radiant heat the major portion of which is of wave length within an infra red wave length band from 10,000 Angstrom units to 20,000 Angstrom units.

3. A process for the polymerization of styrene which comprises effecting polymerization by heating said styrene under polymerizing temperature conditions below 200° C. by radiant energy the major portion of which consists of infra red rays of wave length lying within the band of infra red wave length from 10,000 Angstrom units to 20,000 Angstrom units.

4. A process for the polymerization of styrene which comprises causing polymerization by the application of heat to said styrene under temperature conditions between 80° and 160° C., said heat being applied by irradiating said styrene with radiant energy the major portion of which is of wave length lying in the range from 10,000 Angstrom units to 16,000 Angstrom units.

5. A process for the production of polystyrene having relatively little tendency to exhibit craze when aged and having a relatively high initial softening point which comprises heating styrene in concentration of at least 30% to cause its polymerization to polystyrene, said heating being effected under temperature conditions between approximately 90° and 12° C. by radiant heat the major portion of which consists of infra red radiation of wave length within the band of wave lengths from 10,000 Angstrom units to 16,000 Angstrom units.

6. A process for the polymerization of methyl styrene which comprises effecting polymerization by heating said methyl styrene at polymerizing temperature below 200° C. by radiant energy the major portion of which is of wave length within the infra red wave length band from 10,000 Angstrom units to 20,000 Angstrom units.

7. A process for the polymerization of ring substituted methyl styrene which comprises polymerizing said methyl styrene by heating the same at temperatures between 80° and 160° C. by radiation the major portion of which consists of infra red rays characterized by wave length within the range from 10,000 Angstrom units to 16,000 Angstrom units.

8. A process for the polymerization of a polymerizable resin-forming unsaturated hydrocarbon containing the styrene nucleus, said hydrocarbon being capable of being polymerized with the aid of heat which comprises irradiating said hydrocarbon at polymerizing temperature below 200° C. in the presence of a contact catalyst for said polymerization with radiant heat the major portion of which consists of infra red radiation of wave length lying in the range from 10,000 Angstrom units 16,000 Angstrom units.

9. Polystyrene produced under temperature conditions below 200° C. by the polymerizing action of radiant energy having its major portion in the form of infra red radiation included in that part of the infra red portion of the spectrum characterized by wave lengths between 10,000 Angstrom units and 20,000 Angstrom units, said polystyrene being characterized by relative freedom from the development of craze on aging and by relatively high initial softening point.

10. Polystyrene produced from monomeric styrene having a concentration of at least 30% and polymerized under temperature conditions between 80° and 160° C. by the action of radiant energy having its major portion in the form of infra red radiation of wave length between 10,000 Angstrom units and 16,000 Angstrom units, said polystryene being characterized by having a relative freedom from the development of craze on aging and having an initial softening point of at least 100° C.

11. Polymethyl styrene produced by the polymerization of ring substituted methyl styrene under temperature conditions between 80° and 160° C. and by the action of radiant heat having a major portion thereof in the form of infra red radiation of wave length within the wave length band from 10,000 Angstrom units to 20,000 Angstrom units.

FRANK J. SODAY.